United States Patent
Hirami et al.

[11] Patent Number: 5,121,484
[45] Date of Patent: Jun. 9, 1992

[54] WORD PROCESSING DEVICE WITH AN AUTOMATIC ADDRESS-INPUT FUNCTION

[75] Inventors: Akira Hirami; Hiroki Sugimoto, both of Nara, Japan

[73] Assignee: Sharp Kabushiki Kaisha, Osaka, Japan

[21] Appl. No.: 382,234

[22] Filed: Jul. 19, 1989

[30] Foreign Application Priority Data

Jul. 22, 1988 [JP] Japan ................. 63-184292

[51] Int. Cl.⁵ .............................................. G11B 27/00
[52] U.S. Cl. ................... 395/275; 364/225.6; 364/225.8; 364/943.1; 364/943.43
[58] Field of Search .............. 364/200, 900, 943.43, 364/943, 401, 478, 464.03

[56] References Cited

U.S. PATENT DOCUMENTS

| | | | |
|---|---|---|---|
| 4,757,267 | 7/1988 | Riskin | 379/113 |
| 4,760,528 | 7/1988 | Levin | 364/419 |
| 4,763,252 | 8/1988 | Rose | 364/200 |
| 4,797,832 | 1/1989 | Axelrod et al. | 364/478 |
| 4,800,506 | 1/1989 | Axelrod et al. | 364/478 |
| 4,853,869 | 8/1989 | Durst, Jr. et al. | 364/478 |
| 4,868,757 | 9/1989 | Gil | 364/464.03 |
| 4,892,238 | 7/1990 | Venema | 364/419 |
| 4,969,097 | 11/1990 | Levin | 364/419 |
| 4,994,968 | 2/1991 | Kato et al. | 364/419 |

FOREIGN PATENT DOCUMENTS

56-19135 2/1981 Japan .
58-54431 3/1983 Japan .
61-75468 4/1986 Japan .

OTHER PUBLICATIONS

"Postal Service Mobile Exhibit Focuses on Automation", PR Newswire, Nov. 16, 1989.
"Melissa Data Announces New Zip Code Database", May 1, 1987, News release, p. 11.
Mendelson, Edward, "NVelope", *PC Magazine* Dec. 13, 1988, p. 221.
"A Duo For Manipulating Mail", *BYTE*, Nov. 1988, p. 84.

*Primary Examiner*—Michael R. Fleming
*Assistant Examiner*—Glenn A. Auve
*Attorney, Agent, or Firm*—Cohen, Pontani, Lieberman & Pavane

[57] ABSTRACT

A word processing device with an automatic address-input function comprises a keyboard for inputting a postal code and address; a memory for storing the postal code and address inputted from the keyboard, in correlation with each other; and a processing unit for retrieving a postal code identical with the postal code inputted from the keyboard among postal codes stored in the memory, for reading an address corresponding to the retrieved postal code from the memory and for making the memory store the address in correlation with a postal code inputted from the keyboard.

5 Claims, 2 Drawing Sheets

WORD PROCESSING DEVICE WITH AN AUTOMATIC ADDRESS-INPUT FUNCTION

BACKGROUND OF THE INVENTION

Field of the Invention

The present invention relates to a word processing device such as a word processor, which has an input unit capable of inputting a postal code and address.

Description of the Related Art

In making an address list using a word processing device, several postal codes and addresses are often required to be inputted in a successive way. In such case, each address must be inputted in its full address even when a newly inputted address includes the common address with a previously registered address, which would be inconvenient.

In Japanese Patent Laid-Open No. 19135/1981, there is disclosed a device capable of automatically inputting a postal district after a postal code corresponding to it is inputted, using a shift table between a postal code and a postal district. Further, in Japanese Patent Laid-Open No. 54431/1983, there is disclosed a device capable of retrieving a complete spelling from a registered file and inputting it when an abbreviated word is given.

SUMMARY OF THE INVENTION

Accordingly, it is an object of the present invention to provide a word processing device with an automatic address-input function which retrieves an address corresponding to a previously inputted postal code when a postal code identical with the previously inputted postal code is newly inputted and which automatically inputs the retrieved address, so that work efficiency is improved in inputting an address.

The word processing device with an automatic address-input function according to the present invention comprises key input means for inputting a postal code and address; storage means for storing the postal code and address inputted from the key input means, in correlation with each other; retrieving means for retrieving a postal code indentical with the postal code inputted from the key input means among postal codes stored in the storage means; and writing means for reading an address corresponding to the postal code retrieved by the retrieving means from the storage means and for making the storage means store the address in correlation with a postal code inputted from the key input means.

As will be recognized from the above description, a postal code and address inputted from the key input means are stored in the storage means in correlation with each other.

When a postal code is newly inputted from the key input means, the retrieving means retrieves a postal code identical with the newly inputted postal code among postal codes stored in the storage means. The writing means reads an address corresponding to the postal code retrieved by the retrieving means from the storage means and makes the storage means store the address in correlation with a postal code inputted from the key input means.

Thus, when a postal code identical with a previously inputted postal code is newly inputted, an address is retrieved on the basis of the postal code, and the retrieved address is automatically stored in the storage means so that the address corresponding to the postal code is newly inputted.

DESCRIPTION OF THE PREFERRED EMBODIMENT

Figure 1:
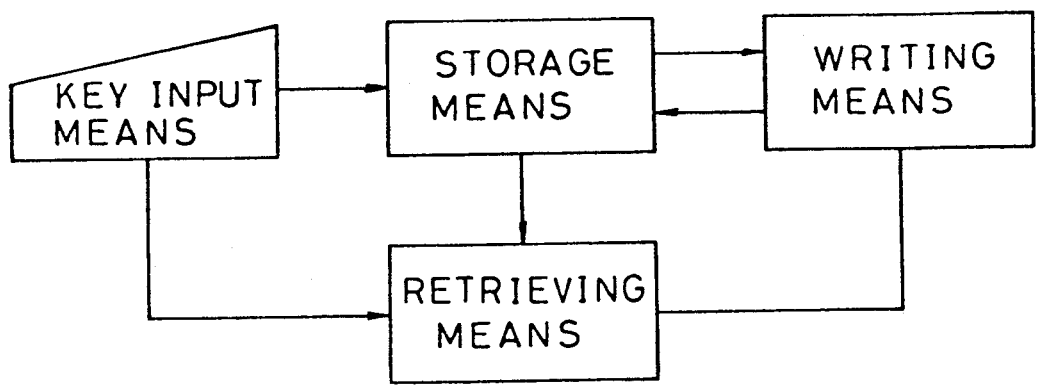
FIG. 1 is a block diagram showing a basic architecture of the present invention.

The word processing device with an automatic address-input function of the present invention has a basic architecture mainly including key input means, storage means, retrieving means and writing means, as shown in FIG. 1.

The key input means includes known languages shift device such as a kana (Japanese alphabet)—Chinese character shift device capable of shifting an inputted character string of kana into a sentence made of a combination of kana and Chinese characters.

The key input means may input a postal code as a numerical value and an address as e.g., a kana-Chinese character combined sentence; for example, a keyboard and a tablet device are used.

The storage means may store a postal code and address inputted from the key input means in correlation with each other; for example, an internal storage medium such as a ROM or an external storage medium such as a floppy disc and a magnetic disc is used.

The retrieving means may retrieve a postal code identical with a postal code inputted from the key input means among postal codes stored in the storage means, and the writing means may read an address corresponding to the retrieved postal code from the storage means and make the storage means store the address in correlated with a postal code inputted from the key input means; for example, a microprocessor is conveniently used as these means.

Postal code is defined herein as numerical numbers used for simplifying delivery of mail; it corresponds to zip code in the United States and is usually represented in a number of three or five figures.

The preferred embodiment of the present invention will be explained with reference to the accompanying drawings. It is not intended to limit the invention to the precise form disclosed.

Figure 2:
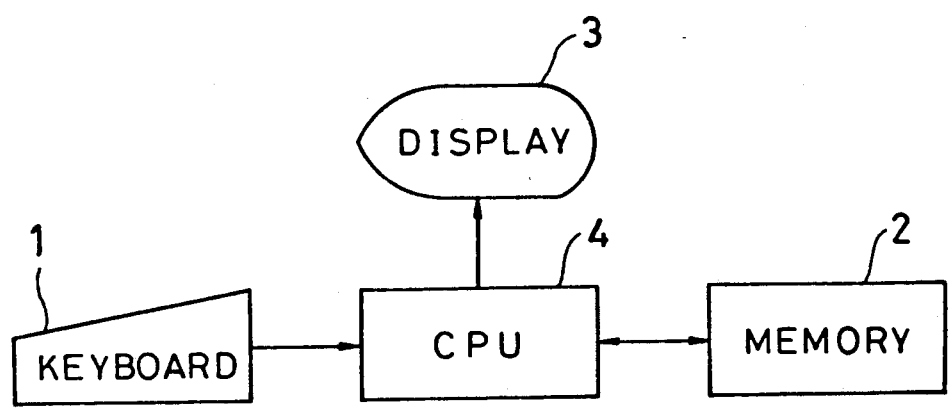
FIG. 2 is a block diagram showing an architecture of an application of the present invention to a word processor.

FIG. 2 is a block diagram showing an architecture of an application of the invention to a word processor.

Referring to FIG. 2, the word processor includes a keyboard 1 for inputting a postal code and address, a memory 2 of RAMs for storing the postal code and address inputted from the keyboard 1 in correlation with each other, a display 3 such as a CRT display and an LCD (liquid crystal display), which displays data inputted from the keyboard 1 and stored in the memory 2.

The word processor also includes a CPU 4, which retrieves a postal code identical with a postal code inputted from the keyboard 1 among postal codes stored in the memory 2 and reads an address corresponding to the retrieved postal code from the memory 2 to store it in the memory 2 in correlation with the postal code inputted from the keyboard 1.

Specifically, the CPU 4 writes a postal code, address, name and the like which is inputted from the keyboard 1, in the memory 2 as described below.

First, an asterisk "*" for a flag in retrieving, number numerals of three figures for a count number "001", and a first return mark " ↵ " are automatically written in order.

After the first return mark, a number of three or five figures for a postal code inputted from the keyboard 1 and a second return mark are written. Then, an address inputted from the keyboard 1 and shifted to a kana-Chinese character combined sentence and a third return mark in several lines are written and, further, a name and a fourth return mark are written in order.

When a note must be added, the contents of the note and a return mark are written after the last return mark and, thus, writing of a set of address is completed.

In the second writing, an asterisk "*" and a count number "002" are written before input of a postal code.

The CPU thus writes postal codes, addresses, names and notes in the memory 2 one after another.

When a postal code is inputted from the keyboard 1 and automatic input of the corresponding address is commanded in the course of input as stated above, the CPU 4 retrieves a postal code identical with the inputted postal code, from the beginning of data in the memory 2 using the asterisk as a sign.

The CPU 4 retrieves as described below. First, the retrieving begins with searching for the first asterisk from the beginning of data in the memory 2. Finding out the asterisk, characters between the first return mark after the asterisk and the second return mark are regarded as a postal code and compared with the inputted postal code.

As a result of the comparison, when an identity is not verified, remaining data are skipped to the next asterisk, and then the same procedure is repeated.

When an identity is verified, characters between the second return mark immediately after the postal code and the third return mark are regarded as the address corresponding to the postal code, and the address is copied to an address input position in the memory 2 which is now being used for address data input.

Thus the CPU 4 automatically inputs an address corresponding to an inputted postal code.

Figure 3:
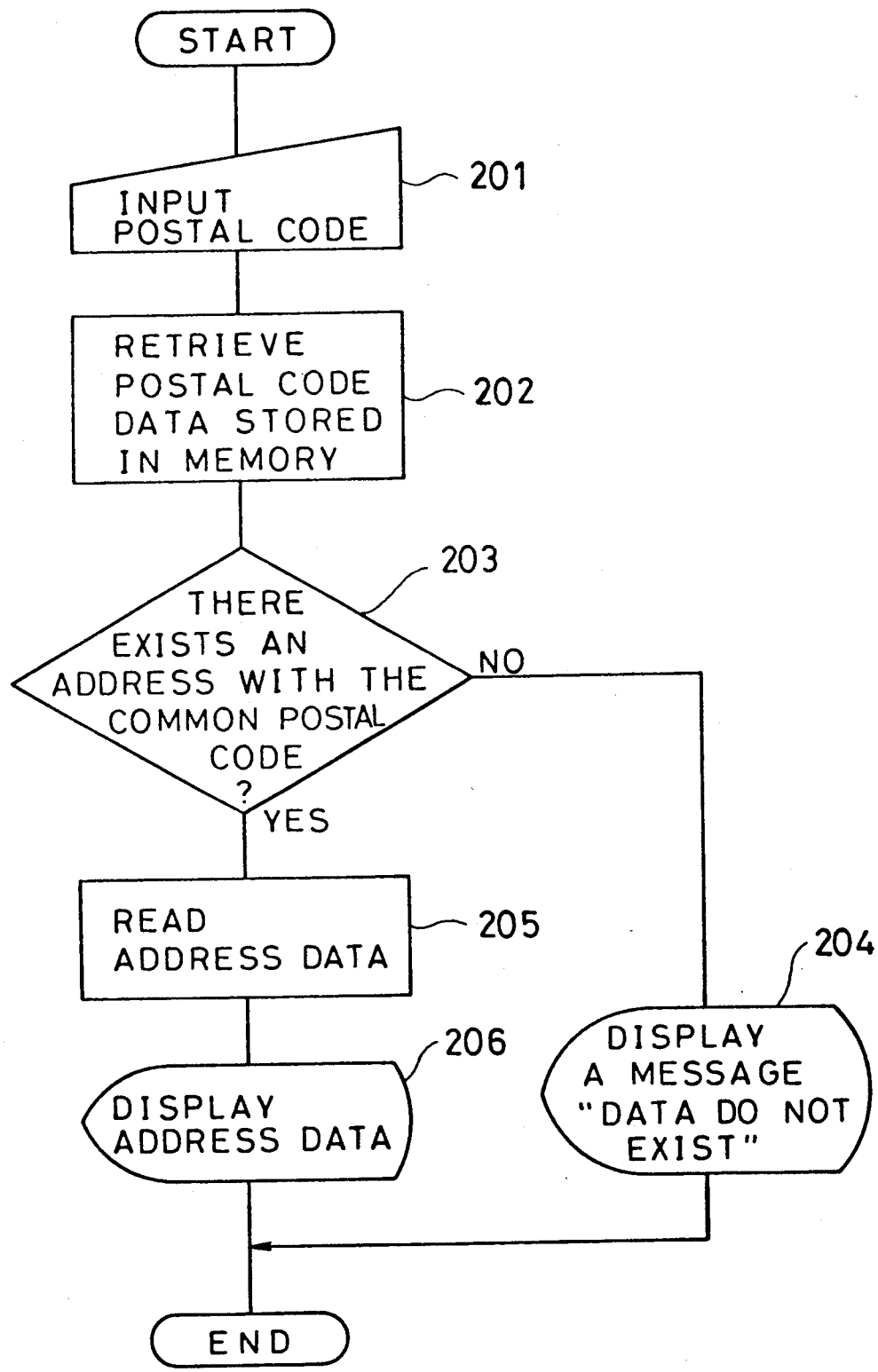
FIG. 3 is a flow chart illustrating the operation of an embodiment according to the present invention.

The operation of the embodiment will be explained with reference to a flow chart of FIG. 3.

It is assumed herein that the memory 2 stores a postal code and corresponding address in correlation with each other in advance and stored information is displayed on a screen of the display 3.

When a postal code is inputted from the keyboard 1 (Step 201), the CPU 4 retrieves postal code data stored in the memory 2 (Step 202) and judges whether a postal code identical with the postal code inputted from the keyboard 1 exists or not (Step 203).

When such a postal code does not exist, the CPU 4 makes the display 3 indicate a message "Data do not exist" on the screen (Step 204). When such a postal code exists, the CPU 4 reads address data corresponding to the postal code (Step 205), makes the memory 2 store the address data in correlation with the postal code inputted in Step 201 and makes the display 3 indicate it on the screen (Step 206).

Thus, when a postal code identical with a previously inputted postal code is inputted, an address is retrieved on the basis of the postal code and the retrieved address is automatically inputted.

Consequently, simplified address input is attained, and work efficiency is improved in inputting an address.

What is claimed is:

1. A word processing device with an automatic address-input function, comprising:

key input means manually operable for sequentially inputting a plurality of data sets each comprising first a postal code and then a related address;

storage means connected to said key input means for storing each said postal code as a stored postal code and the related address as a stored related address in indexed relation to each other as each said postal code and related address are entered from said key input means to thereby define a single data set stored in said storage means, said storage means having a related address input location;

retrieving means connected to said storage means for retrieving from said storage means, as each said postal code is newly inputted from said key input means, a stored postal code identical with the newly inputted postal code from among the postal codes which have been previously inputted and stored by said storage means; and writing means for automatically entering an address related to said newly inputted postal code into an address input location in said storage means, said writing means comprising:

read-out means connected to said storage means for reading out from said storage means a read-out address comprising said stored address related to the retrieved stored identical postal code; and copying means for copying the read-out address from said read-out means into said storage means at said related address input location so as to relate the read-out address with the newly inputted postal code and thereby define a new data set in said storage means, so that manual inputting from said key input means of an address related to the newly inputted postal code is avoided where said storage means already contains a data set having a postal code identical to the newly inputted postal code.

2. The device according to claim 1 further comprising display means connected to said storage means for visually displaying the postal code and the related address stored in said storage means.

3. The device according to claim 1, wherein said storage means further comprises counting means for numerically counting the postal codes inputted from said key input means and for generating a count number corresponding to the number counted, and character generating means for generating and storing an asterisk character at the beginning of a stored character string indicating the beginning of said stored character string, said character string containing character data representing the postal code and the related address, said data having a data format consisting of a count number, a first return character, a first group of characters representing a postal code, a second return character, a second group of characters representing a related address, and a third return character, so that when a postal code and related address are inputted from said key input means, the postal code and related address are stored in indexed relation to each other.

4. The device according to claim 3, wherein said retrieving means further comprises means for retrieving a related address from said storage means by sequentially searching for an asterisk character at the beginning of said character string stored in said storage means when a postal code is inputted from said key input means, recognizing said first group of characters between said first and said second return characters of said character string as a postal code and then comparing said first group of characters with the newly inputted postal code so that a stored postal code and the related address identical with the newly inputted postal code are retrieved from among postal codes and related addresses previously stored in said storage means.

5. The device according to claim 4, wherein said writing means further comprises means for recognizing said second group of characters between said second and said third return characters of said character string as a related address related to the retrieved postal code and for copying the related address to said related address input location in said storage means, so that the related address related to the retrieved postal code is stored in said storage means in said related address input location in indexed relation to the newly inputted postal code.

* * * * *